(12) United States Patent
Jacob (10) Patent No.: US 9,266,026 B2
(45) Date of Patent: *Feb. 23, 2016

(54) METHOD AND APPARATUS FOR DYNAMICALLY ADJUSTING GAME OR OTHER SIMULATION DIFFICULTY

(71) Applicant: Sony Computer Entertainment America LLC, San Mateo, CA (US)

(72) Inventor: Mark Lester Jacob, Annecy-le-vieux (FR)

(73) Assignee: Sony Computer Entertainment LLC, Foster City, CA (US)

(*) Notice: Subject to any disclaimer, the term of this patent is extended or adjusted under 35 U.S.C. 154(b) by 201 days.

This patent is subject to a terminal disclaimer.

(21) Appl. No.: 13/932,446

(22) Filed: Jul. 1, 2013

(65) Prior Publication Data

US 2013/0311951 A1    Nov. 21, 2013

Related U.S. Application Data

(63) Continuation of application No. 12/105,177, filed on Apr. 17, 2008, now Pat. No. 8,475,274.

(60) Provisional application No. 60/915,175, filed on May 1, 2007, provisional application No. 60/914,235, filed on Apr. 26, 2007.

(51) Int. Cl.
*A63F 9/24* (2006.01)
*A63F 13/67* (2014.01)
*A63F 13/40* (2014.01)
*G06F 3/0481* (2013.01)

(52) U.S. Cl.
CPC .................. *A63F 13/67* (2014.09); *A63F 13/10* (2013.01); *G06F 3/04815* (2013.01); *A63F 2300/305* (2013.01); *A63F 2300/6027* (2013.01); *A63F 2300/6081* (2013.01)

(58) Field of Classification Search
CPC .......... A63F 13/10; A63F 13/06; A63F 13/12
USPC .......................................... 463/23, 31, 36–38
See application file for complete search history.

(56) References Cited

U.S. PATENT DOCUMENTS

| | | | |
|---|---|---|---|
| 4,657,247 A | 4/1987 | Okada | |
| 4,679,789 A | 7/1987 | Okada | |
| 5,720,663 A | 2/1998 | Nakatani et al. | |
| 6,545,661 B1 | 4/2003 | Goschy | |

(Continued)

OTHER PUBLICATIONS

United States Patent and Trademark Office, Office Action issued in U.S. Appl. No. 12/105,177, mailed May 26, 2011, 10 pp.

(Continued)

*Primary Examiner* — Omkar Deodhar
(74) *Attorney, Agent, or Firm* — Fitch, Even, Tabin & Flannery LLP (57) ABSTRACT

A method for use with a simulation includes running the simulation, receiving information from a control interface used by a user to interact with the simulation, analyzing the received information, forming at least an indication of the user's level of skill based on the analysis of the received information, and adjusting a difficulty level of the simulation based on the indication of the user's level of skill. A storage medium storing a computer program executable by a processor based system and an apparatus for use with a simulation are also disclosed.

30 Claims, 5 Drawing Sheets

(56) References Cited

U.S. PATENT DOCUMENTS

| | | |
|---|---|---|
| 9,069,441 B2 | 6/2015 | Jacob |
| 2002/0137566 A1 | 9/2002 | Tomizawa et al. |
| 2005/0014542 A1 | 1/2005 | Ueshima |
| 2006/0281535 A1 | 12/2006 | Bogan |
| 2007/0082729 A1 | 4/2007 | Letovsky |
| 2008/0194337 A1 | 8/2008 | Hensel |
| 2008/0254898 A1 | 10/2008 | Endo |
| 2008/0266250 A1 | 10/2008 | Jacob |
| 2008/0268943 A1 | 10/2008 | Jacob |
| 2011/0269528 A1 | 11/2011 | Jacob |
| 2013/0311951 A1 | 11/2013 | Jacob |
| 2014/0004925 A1 | 1/2014 | Jacob |

OTHER PUBLICATIONS

United States Patent and Trademark Office, Office Action issued in U.S. Appl. No. 12/105,174, mailed Jul. 15, 2011, 11 pp.
United States Patent and Trademark Office, Office Action issued in U.S. Appl. No. 12/105,177, mailed Oct. 18, 2011, 10 pp.
United States Patent and Trademark Office, Office Action/Restriction Requirement issued in U.S. Appl. No. 12/105,174, mailed Apr. 6, 2011, 6 pp.
Riverdeep Interactive Learning Limited, Mavis Beacon Teaches Typing, Version 15, "Enhanced User's Guide," 2001, 92 pp.
United States Patent and Trademark Office, Office Action issued in U.S. Appl. No. 12/105,174, mailed Dec. 30, 2011, 9 pp.
United States Patent and Trademark Office, Office Action issued in U.S. Appl. No. 12/105,177, mailed Jun. 1, 2012, 21 pp.
United States Patent and Trademark Office, Office Action issued in U.S. Appl. No. 12/105,174, mailed Jul. 5, 2012, 9 pp.
United States Patent and Trademark Office, Office Action issued in U.S. Appl. No. 13/183,297, mailed Jul. 2, 2012, 10 pp.
United States Patent and Trademark Office, Final Office Action issued in U.S. Appl. No. 12/105,174, mailed Nov. 29, 2012.
United States Patent and Trademark Office, Final Office Action issued in U.S. Appl. No. 13/183,297, mailed Dec. 7, 2012, 10 pp.
United States Patent and Trademark Office, Notice of Allowance issued in U.S. Appl. No. 12/105,177, mailed Mar. 4, 2013, 9 pp.
United States Patent and Trademark Office, Notice of Allowance issued in U.S. Appl. No. 13/183,297, mailed May 1, 2013, 10 pp.
USPTO, Office Action issued in U.S. Appl. No. 14/015,359, mailed Sep. 3, 2014, 12 pp.
USPTO; Notice of Allowance and Fees Due issued in U.S. Appl. No. 14/015,359, mailed Feb. 23, 2015, 9 pages.
USPTO, Office Action issued in U.S. Appl. No. 14/733,666, mailed Nov. 25, 2015, 17 pp.

METHOD AND APPARATUS FOR DYNAMICALLY ADJUSTING GAME OR OTHER SIMULATION DIFFICULTY

CROSS-REFERENCE TO RELATED APPLICATION

This application is a continuation of prior U.S. patent application Ser. No. 12/105,177, filed Apr. 17, 2008, now U.S. Pat. No. 8,475,274 issued Jul. 2, 2013, and claims the benefit of U.S. Provisional Application No. 60/915,175, filed May 1, 2007, and U.S. Provisional Application No. 60/914,235, filed Apr. 26, 2007, which are all incorporated herein by reference in their entirety. This application is related to U.S. patent application Ser. No. 12/105,174, filed Apr. 17, 2008, and entitled "METHOD AND APPARATUS FOR ADJUSTMENT OF GAME PARAMETERS BASED ON MEASUREMENT OF USER PERFORMANCE," the entire disclosure of which is hereby fully incorporated herein by reference in its entirety.

BACKGROUND OF THE INVENTION

1. Field of the Invention

Embodiments of the present invention relate generally to video games and other simulations, and more specifically to the different difficulty levels of such games and simulations.

2. Discussion of the Related Art

Video games and other simulations typically include the ability to provide different levels of playing difficulty for the player or other user. The different levels of difficulty are provided so that the same game can accommodate a wide range of players. Namely, a game can be set to a higher difficulty level in order to keep an experienced and skillful player interested, or the same game can be set to a lower difficulty level in order to keep a beginner or casual player from getting frustrated.

It is with respect to these and other background information factors that the present invention has evolved.

SUMMARY OF THE INVENTION

One embodiment provides a method for use with a simulation, comprising: running the simulation; receiving information from a control interface used by a user to interact with the simulation; analyzing the received information; forming at least an indication of the user's level of skill based on the analysis of the received information; and adjusting a difficulty level of the simulation based on the indication of the user's level of skill.

Another embodiment provides a storage medium storing a computer program executable by a processor based system, the computer program causing the processor based system to execute steps comprising: running a simulation; receiving information from a control interface used by a user to interact with the simulation; analyzing the received information; forming at least an indication of the user's level of skill based on the analysis of the received information; and adjusting a difficulty level of the simulation based on the indication of the user's level of skill.

Another embodiment provides an apparatus for use with a simulation, comprising: a control interface for use by a user to interact with the simulation; and a processor based system configured to run the simulation, receive information from the control interface, analyze the received information, form at least an indication of the user's level of skill based on the analysis of the received information, and adjust a difficulty level of the simulation based on the indication of the user's level of skill.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Some of the embodiments of the present invention provide various schemes for determining the level of skill, playing ability, and/or level of control of a person playing a video game or other simulation and then using such determination to dynamically adjust the difficulty level of the game. By making minute adjustments to the difficulty level over time it is believed that one can ensure a pleasurable experience for gamers of all levels by keeping the difficulty level low for casual gamers while also increasing complexity for those with better hand-eye or hand-ear coordination.

Figure 1:
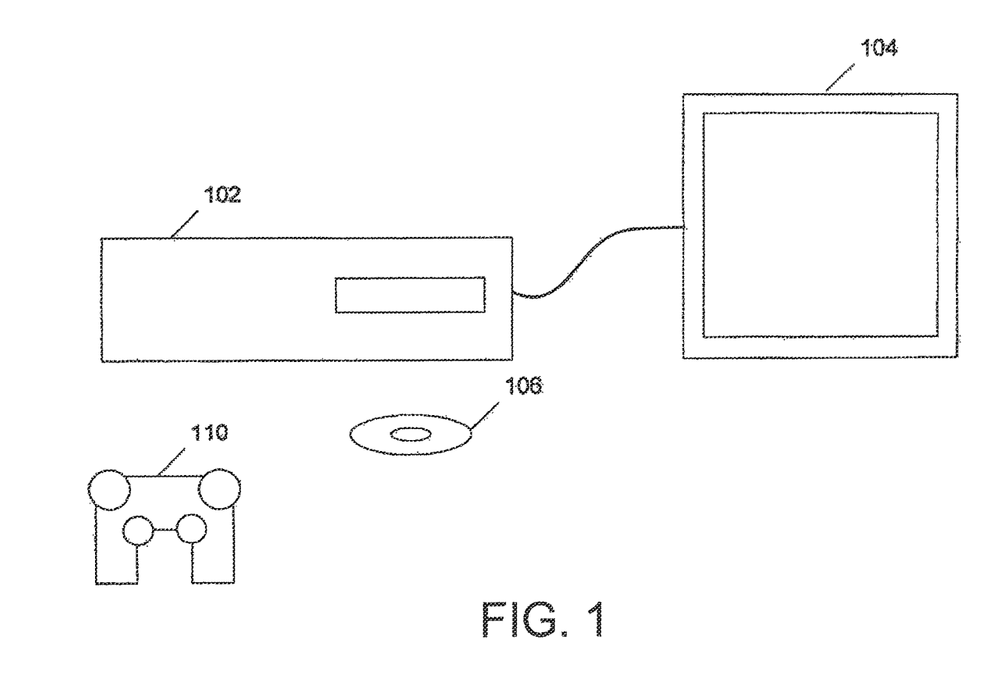
FIG. 1 is a block diagram illustrating a system that operates in accordance with an embodiment of the present invention.

FIG. 1 is a block diagram illustrating a system that may be used for implementing, running, executing, and/or using one or more embodiments of the present invention. As illustrated in FIG. 1, a computer, or game, entertainment console 102 may be coupled to a video display 104 such as a television or other type of visual display. A game or other simulations may be stored on a storage media 106 such as a DVD, a CD, flash memory, USB memory or other type of memory media. The storage media 106 can be inserted to the console 102 where it is read. The console 102 can then read program instructions stored on the storage media and present a game interface to the user.

Typically, a user or player manipulates a control interface such as a game controller 110 to control and interact with the video game or other simulation. The game controller 110 may include conventional controls, for example, control input devices such as joysticks, buttons and the like. In addition, the game controller 110 can include an internal sensor, for example an accelerometer, that produces signals in response to the position motion orientation or change in orientation of the game controller 110.

During operation of the console 102 when user is playing a game, the user can use the game controller 110 to interact with the game. For example, the user may push buttons, or use a joystick on the controller 110 to interact with the game. In addition, the user can move the controller 110 in a direction such as up, down, to one side, to the other side, twisted, wedged, shaken, jerked, punched, etc. In addition to using the controller to interact with the game, use of buttons, joysticks, and movements of the controller 110, and the like, may be detected and captured in the game console 102 for analysis of the user's game performance.

In general, signals from the game controller 110 are used to generate positions and orientation data that may be used to calculate many physical aspects of the user's interaction with the game. Certain movement patterns or gestures for the controller 110 may be predefined and used as input commands for the game or other simulation. For example, a plunging downward gesture of the controller 110 may be defined as one command, a twisting gesture of the controller 110 may be defined as another command, a shaking gesture of the controller 110 may be defined as still another command, and so on. In this way the manner in which the user physically moves the controller 110 can be used as an input for controlling the game which provides more pleasurable and stimulating experience for the user.

In accordance with an embodiment of the present invention, as a user interacts with a game by using the controller, the user's performance can be monitored so as to determine a user's experience level. Likewise, as a user maneuvers through the game environment the amount of movement the user imparts to the controller can be monitored to determine the user's experience level. For example, if a user is going through an environment where very small movements of the player are desirable yet the controller is moved through large motion, it may be determined that the user is not very experienced. In this way, the amount of movement that the user imparts to the controller can be scaled so that as the user maneuvers through the environment it more closely matches the expected movement patterns.

Figure 2:
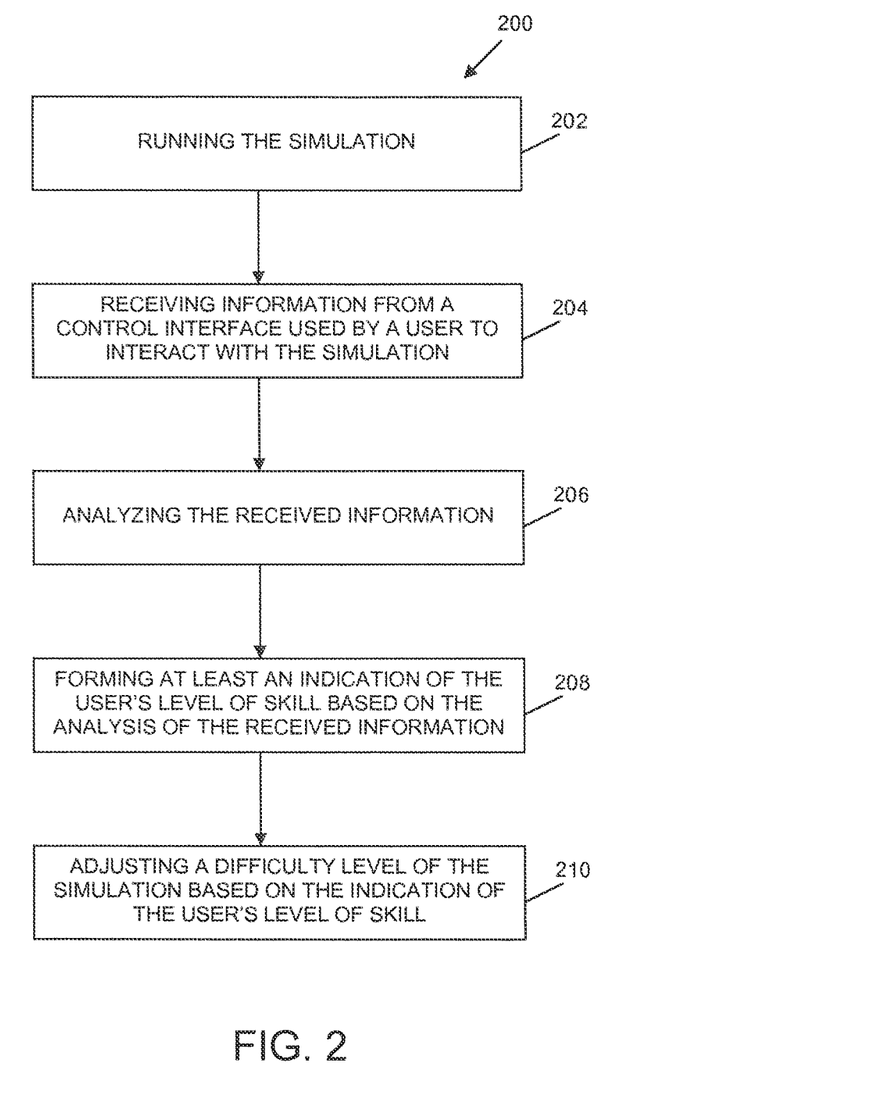
FIG. 2 is a flow diagram illustrating a method for use with a simulation in accordance with an embodiment of the present invention.

FIG. 2 illustrates a method 200 that operates in accordance with an embodiment of the present invention. The method 200, which may be used with a simulation such as a video game, begins in step 202 with running the simulation. In some embodiments, the simulation may be of the type with which a user may interact using a control interface, such as a handheld controller, game pad, keyboard, mouse, wand, or other control interface.

In step 204, information is received from the control interface used by the user interacting with the simulation. In some embodiments, the received information may comprise any type of information or data normally generated by a control interface. For example, such information may comprise signals that result from the user pushing buttons or manipulating other control mechanisms on the control interface. The user typically pushes buttons or manipulates other control mechanisms on the control interface in order to interact with the video game or other simulation.

As will be discussed below, in some embodiments the control interface may comprise a motion sensing controller. In such embodiments the received information may comprise information relating to the three-dimensional movements of the motion sensing controller.

In step 206, the received information is analyzed. The received information is analyzed as part of determining the level of skill, playing ability, and/or level of control of the person playing the video game or other simulation. The analysis of the received information may take into account various aspects of the current state of the simulation. Furthermore, the received information may be analyzed to gauge, estimate or determine any type of parameter related to the user's level of control in the simulation. For example, in some embodiments the received information may be analyzed to gauge one or more of the user's response times in the simulation. That is, the time it takes the user to respond to events in the simulation may be measured. Such measurements may be an indication of the user's level of skill or playing ability.

In some embodiments, the received information may be analyzed to determine the accuracy of one or more of the user's responses in the simulation. For example, in a shooter game the information received from the control interface may be analyzed to determine whether or not the user hit the target. As another example, in a driving game the information received from the control interface may be analyzed to determine whether or not the user successfully navigated the course or avoided an obstacle.

In some embodiments, the step of analyzing the received information may further comprise compiling a history of the parameters that are analyzed. For example, a history of the user's response times in the simulation maybe compiled. In another example, the step of analyzing the received information may comprise compiling a history of the accuracy of the user's responses in the simulation. Reviewing a history of these types of measurements may be helpful in determining the level of skill, playing ability, and/or level of control of the person playing the video game or other simulation. Thus, in some embodiments a history may be kept of how well the user controls the video game or other simulation.

In step 208, at least an indication of the user's level of skill is formed based on the analysis of the received information. In some embodiments, such an indication may be formed by reviewing one or more of the above-described history of analyzed parameters. Such a review may lead to trends in the user's responses being identified. For example, if many of the user's response times are long, or many of the user's responses and/or actions are not accurate, this may indicate that the user's level of skill is lower than the simulation's current level of difficulty setting. In some embodiments, the indication of the user's level of skill may optionally be used to estimate the age of the user based on how well the user is responding, or to estimate some other parameter.

In step 210, a difficulty level of the simulation is adjusted based on the indication of the user's level of skill. Continuing with the above example, there was an indication that the user's level of skill is lower than the simulation's current level of difficulty setting. As such, the difficulty level of the simulation is adjusted to make the simulation easier because a decreased level of difficulty appears to be more suitable for the user. It is believed that such an adjustment may help the user from getting frustrated with the simulation.

In some embodiments, the step of adjusting a difficulty level of the simulation may be performed dynamically. For example, the difficulty of the simulation may be continuously or periodically adjusted while it is running based on the most recent analysis of the user's responses. That is, minute adjustments may be made to the difficulty level over time. This way, if aspects of the simulation are made easier in response to the user having difficulties, but then the user's skills begin to improve, various aspects of the simulation can then be made more difficult so that the user continues to find the simulation interesting.

The difficulty level of the simulation may be adjusted in a variety of ways. In some embodiments, the simulation difficulty may be scaled. That is, small adjustments may be made to certain aspects of the simulation to make it slightly more difficult, or slightly less difficult. For example, in some embodiments the display duration of one or more visual cues may be shortened in order to make the simulation more difficult, or the display duration of one or more visual cues may be lengthened in order to make the simulation less difficult. In some embodiments, the number of ghosts or other visual indicators displayed may be reduced in order to make the simulation more difficult, or the number of ghosts or other visual indicators displayed may be increased in order to make the simulation less difficult.

In some embodiments, the volume of auditory cues relative to the game volume may be decreased in order to make the simulation more difficult, or the volume of auditory cues relative to the game volume may be increased in order to make the simulation less difficult.

In some embodiments, the display location of visual cues may be changed to increase difficulty, or a static location of visual cues may be used to decrease difficulty. In some embodiments, if a player responds well to auditory cues but not visual cues, then only visual cues may be used to increase difficulty. Similarly, if a player responds well to visual cues but not auditory cues, then only auditory cues may be used to increase difficulty.

In some embodiments, the speed of the game or other simulation may be slowed down in order to make the simulation less difficult, or the speed may be increased in order to make the simulation more difficult. In some embodiments, the number of hits required to kill a monster or other enemy may be decreased in order to make the simulation less difficult, or the number of hits required to kill a monster or other enemy may be increased in order to make the simulation more difficult.

In some embodiments, if a player response is expected within some time interval of a visual or auditory cue, a "fudge factor" may be introduced and be based on the user's historical input data. For example, the length of the fudge factor may be increased in order to decrease difficulty, or the length of the fudge factor may be decreased, or even eliminated, in order to increase difficulty.

In some embodiments, the control precision requirements may be adjusted based on the user's measured level of control. Namely, the level of precision required by the user may be adjusted. A lower level of precision may be used to decrease difficulty, and a higher level of precision may be used to increase difficulty.

And in some embodiments, the enemy/opponent artificial intelligence (AI) may be scaled up or down based on the user's measured level of control. For example, the AI may be scaled down to decrease difficulty, and the AI may be scaled up to increase difficulty.

The above-described techniques are just a few ways that the difficulty level of the simulation may be adjusted and/or scaled. It should be well understood that many other techniques may also be used to adjust and/or scale the difficulty level of the simulation in accordance with various embodiments of the present invention.

As mentioned above, in some embodiments the control interface may comprise a motion sensing controller. In some embodiments the motion sensing controller may comprise a hand-held controller that has the ability to have its three-dimensional movements tracked. Such tracking may be performed in many different ways. For example, such tracking may be performed through inertial, video, acoustical, or infrared analysis. Such motion sensing capabilities may also be implemented with an accelerometer or the like. Examples of motion sensing controllers that may be used are provided below.

In embodiments utilizing a motion sensing controller, the received information may comprise information relating to the three-dimensional movements of the controller. Such information may also be analyzed as part of determining the level of skill, playing ability, and/or level of control of the person playing the video game or other simulation. For example, if a user is rapidly moving the controller around in an erratic manner, this may indicate that the user is having a difficult time controlling the simulation and that the difficulty of the simulation should be decreased. In contrast, if the user is moving the controller very little, this may indicate that the simulation is easy for the user and that the difficulty of the simulation should be increased. Thus, in some embodiments the controller motions may also be used or considered in adjusting the difficulty level of the game or other simulation, and in some embodiments such controller motions may also be used or considered in dynamically adjusting the difficulty level of the game or other simulation.

The information received from the motion sensing controller may be analyzed to gauge, estimate or determine any type of parameter related to the three-dimensional movements of the motion sensing controller. For example, in some embodiments the information received from the motion sensing controller may be analyzed to gauge a speed and/or acceleration of the motion sensing controller. In some embodiments, the information received from the motion sensing controller may be analyzed to estimate a frequency or severity of a shaking motion of the motion sensing controller.

In some embodiments, the step of analyzing the received information may further comprise compiling a history of the three-dimensional movements of the motion sensing controller, such as a history of any of the parameters mentioned above. Reviewing a history of these types of measurements may be helpful in determining if the controller is being kept stationary or being moved around in a vigorous and/or erratic manner. This may in turn be helpful in determining the level of skill, playing ability, and/or level of control of the person playing the video game or other simulation.

In some embodiments, the step of analyzing the received information may further comprise comparing the information described above relating to the user's level of control in the simulation with the information relating to three-dimensional movements of the motion sensing controller. For example, the user's response times and/or response accuracy in the simulation may be compared with the information relating to three-dimensional movements of the motion sensing controller. Such a comparison may further help to determine the level of skill, playing ability, and/or level of control of the person playing the video game or other simulation. For example, if the user's responses tend to be accurate and the motion sensing controller is being kept still, this may indicate that the user is very skillful and that the difficulty of the simulation should be increased. On the other hand, if the user's responses tend to be accurate but the motion sensing controller is moving somewhat erratically, this may indicate that the user is struggling a little and that the difficulty of the simulation should be slightly decreased or left as is to keep the user challenged.

Thus, the level of control of the person using the control interface of a simulation may be determined such as by gauging the user's response times, accuracy, and other parameters. In some embodiments, the user's level of control may also be determined by measuring the three-dimensional movements of a control interface having motion sensing capabilities. That is, the motion sensing capabilities of a motion sensing controller may be used in some embodiments as another measure of the user's level of skill or control. By using a history of any of these types of measurements the difficulty level of a game or other simulation may be dynamically adjusted to suit the user. That is, game difficulty may be adjusted based on historical data or input related to the user's level of skill or control. In some embodiments, the user's level of control or skill may also be determined by gauging the user's response times, accuracy, and any other parameters in a series of visual and/or auditory tests.

Figure 3:
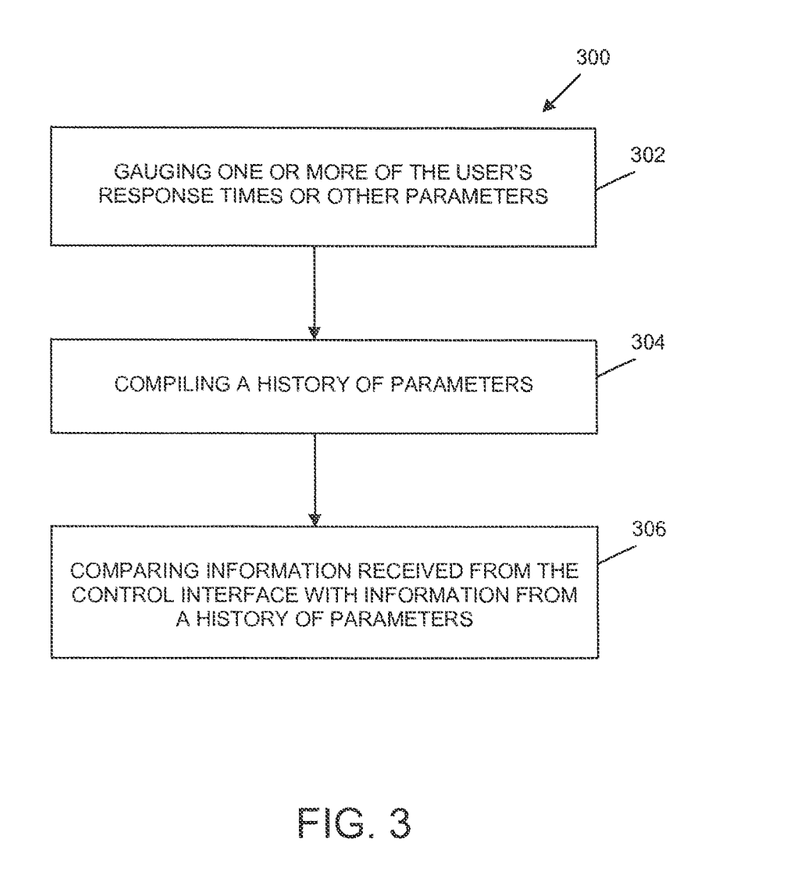
FIG. 3 is a flow diagram illustrating another method in accordance with an embodiment of the present invention.

FIG. 3 illustrates an example 300 of steps that may be used as part of analyzing the information received from the control interface in accordance with an embodiment of the present invention. In step 302, one or more of the user's response times or other parameters in the simulation are gauged or estimated. In step 304, a history of such parameters is compiled. For example, the history may include the user's response times in the simulation, the accuracies of a plurality of the user's responses in the simulation, a history of the three-dimensional movements of a motion sensing controller, etc. And in step 306, information received from the control interface is compared with information from a history of parameters. For example, information relating to the three-dimensional movements of a motion sensing controller may be compared with information relating to an accuracy of one or more of the user's responses in the simulation.

Figure 4A:
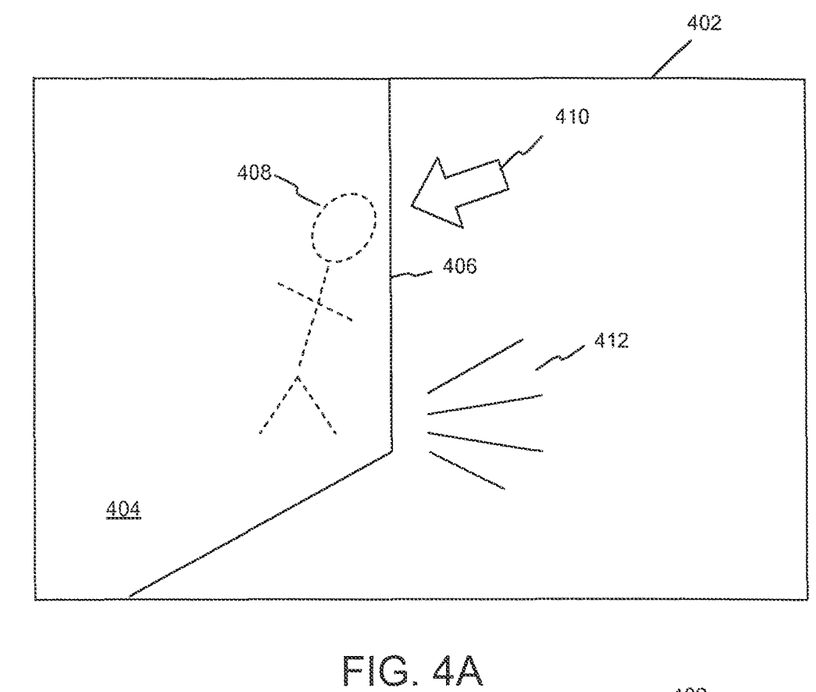
FIGS. 4A and 4B are screen shots illustrating an example application of an embodiment of the present invention.
Figure 4B:
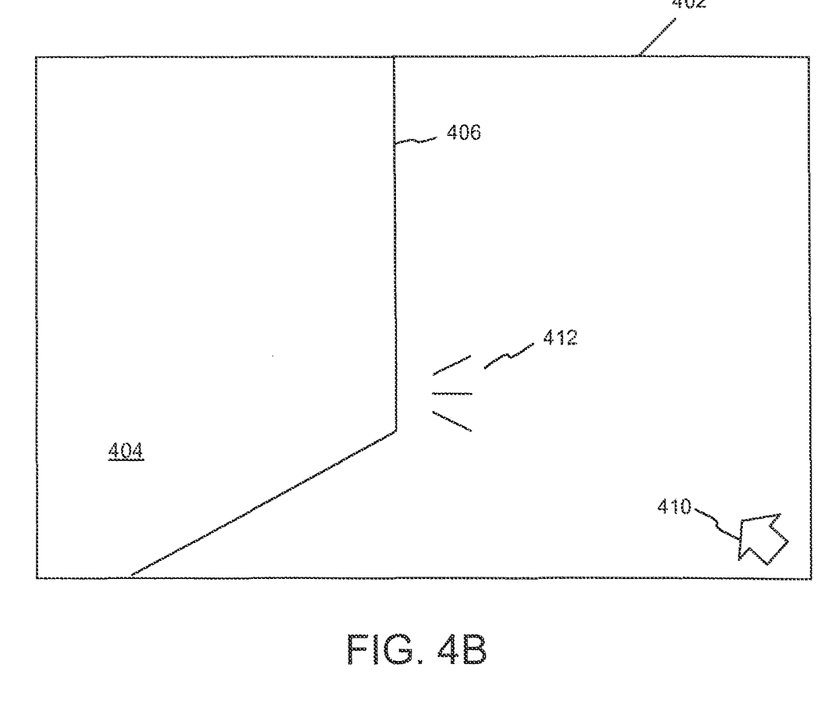

FIGS. 4A and 4B illustrate examples of how the difficulty level of a simulation, such as a game, may be adjusted in accordance with an embodiment of the present invention. In FIG. 4A, a scene in a simulation is shown on a display 402. The scene shows a portion of a hallway, and a wall 404 makes it difficult, if not impossible, for the player viewing the display 402 to see what is around the corner 406. In this particular scene, a villain is lurking around the corner 406.

One visual cue of the villain that may be provided to the player is to provide a ghost 408 that shows the location of the villain. Another visual cue that may be provided to the player is to provide an arrow 410 located very close to the villain and pointing directly to the location of the villain. An auditory cue that may be provided to the player is to provide sound 412 corresponding to, and emanating from, the foot steps of the villain.

In FIG. 4B the difficulty level of the simulation has been adjusted to make the simulation more difficult. For example, the ghost 408 is not displayed. Or, in some embodiments, the display duration of the ghost 408 may have been adjusted to make it shorter. As another example, the display location of the arrow 410 visual cue has been adjusted to move it farther away from the location of the villain. This makes it more difficult for the player to know the purpose of the arrow 410. As another example, the volume of the auditory cue has been adjusted. Namely, the sound 412 corresponding to, and emanating from, the foot steps of the villain has been made quieter. This makes it more difficult for the player to hear the sound 412 and recognize it as footsteps.

As discussed above, in some embodiments the step of adjusting a difficulty level of the simulation may be performed dynamically. For example, the adjustments made in FIG. 4B may have been made dynamically over time. Namely, the screen shot of FIG. 4B may represent a frame of the simulation at some period of time after the screen shot of FIG. 4A. The period of time may be a few frames, a few seconds, a few minutes, or a some other longer or shorter period of time. In this scenario, for example, the volume of the sound 412 may have been turned down over that period time. Or similarly, the ghost 408 may have been eliminated and the arrow 410 moved during that period of time. Thus, this provides one example of how the difficulty of the simulation may be continuously or periodically adjusted while it is running based on the most recent analysis of the user's responses. That is, minute adjustments may be made to the difficulty level over time.

Figure 5:
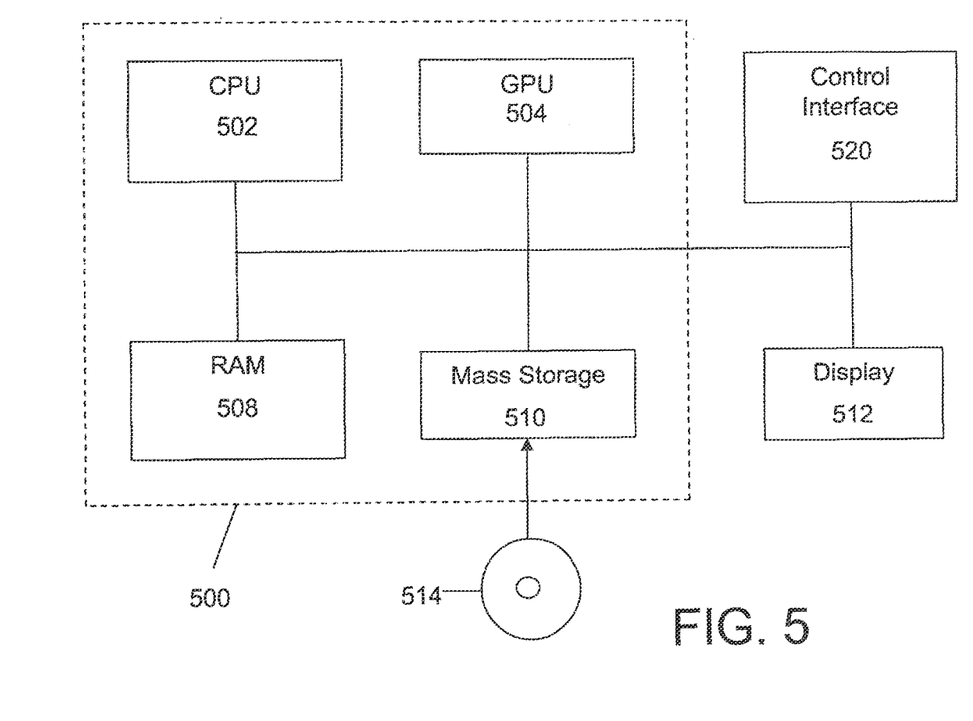
FIG. 5 is a block diagram illustrating a processor based system that may be used to run, implement and/or execute the methods and/or techniques shown and described herein in accordance with embodiments of the present invention.

The methods and techniques described herein may be utilized, implemented and/or run on many different types of computers, entertainment systems, video game consoles, hand-held devices, telephones, graphics workstations, televisions, DVD players, DVRs, media players, home servers, and the like. Referring to FIG. 5, there is illustrated a system 500 that may be used for any such implementations. For example, the system 500 may be used for implementing the entertainment console 102 (FIG. 1). However, the use of the system 500 or any portion thereof is certainly not required.

By way of example, the system 500 may include, but is not required to include, a central processing unit (CPU) 502, a graphics processing unit (GPU) 504, a random access memory (RAM) 508, and a mass storage unit 510, such as a disk drive. The system 500 may be coupled to, or integrated with, a display 512, such as for example any type of display.

The CPU 502 and/or GPU 504 may be used to execute or assist in executing the steps of the methods and techniques described herein, and various program content and images may be rendered on the display 512. For example, the above-mentioned video games or other simulations may be rendered on the display 512. Removable storage media 514 may optionally be used with the mass storage unit 510, which may be used for storing code that implements the methods and techniques described herein. However, any of the storage devices, such as the RAM 508 or mass storage unit 510, may be used for storing such code. Either all or a portion of the system 500 may be embodied in any type of device mentioned herein. Furthermore, the system 500 comprises an example of one embodiment of a processor based system.

The methods and/or techniques described herein may be implemented in hardware, software, and/or a combination of both. For example, a computer program executable by the processor based system 500 may be used for causing the processor based system 500 to execute any of the steps of the methods and/or techniques described herein. For example, in some embodiments, a storage medium, such as any of the storage or memory media or memories described herein, may store a computer program executable by a processor based system. The computer program may cause the processor based system to execute any of the steps of the methods or techniques described herein.

A control interface 520 may be included for allowing a user to interact with the system 500. The control interface 520 may be coupled to the system 500 via a wired or wireless connection. A user may interact with a game or other simulation being run by the system 500 by interacting with the control interface 520. By way of example, the control interface 520 may comprise a hand-held controller (such as the controller 110 shown in FIG. 1), game pad, keyboard, mouse, wand, or other control interface. As mentioned above, a user typically pushes buttons or manipulates other control mechanisms on the control interface 520 in order to interact with the video game or other simulation.

As mentioned above, in some embodiments the control interface 520 may comprise a motion sensing controller. In some embodiments, such motion sensing controller may comprise a hand-held controller that has the ability to have its three-dimensional movements tracked. Again, such tracking may be performed in many different ways. For example, such tracking may be performed through inertial, video, acoustical, or infrared analysis. Such motion sensing capabilities may also be implemented with an accelerometer or the like. As another example, such motion sensing capabilities may be implemented in some embodiments with a so-called "six-axis controller" or the like.

By way of example, in some embodiments the motion sensing controller may comprise any of the types of controllers described in U.S. patent application Ser. No. 11/382,034, filed on May 6, 2006, entitled "SCHEME FOR DETECTING AND TRACKING USER MANIPULATION OF A GAME CONTROLLER BODY", U.S. patent application Ser. No. 11/382,037, filed on May 6, 2006, entitled "SCHEME FOR TRANSLATING MOVEMENTS OF A HAND-HELD CONTROLLER INTO INPUTS FOR A SYSTEM", U.S. patent application Ser. No. 11/382,043, filed on May 7, 2006, entitled "DETECTABLE AND TRACKABLE HAND-HELD CONTROLLER", U.S. patent application Ser. No. 11/382,039, filed on May 7, 2006, entitled "METHOD FOR MAPPING MOVEMENTS OF A HAND-HELD CONTROLLER TO GAME COMMANDS", U.S. patent application Ser. No. 11/382,259, filed on May 8, 2006, entitled "METHOD AND APPARATUS FOR USE IN DETERMINING LACK OF USER ACTIVITY IN RELATION TO A SYSTEM", U.S. patent application Ser. No. 11/382,258, filed on May 8, 2006, entitled "METHOD AND APPARATUS FOR USE IN DETERMINING AN ACTIVITY LEVEL OF A USER IN RELATION TO A SYSTEM", U.S. patent application Ser. No. 11/382,251, filed on May 8, 2006, entitled "HAND-HELD CONTROLLER HAVING DETECTABLE ELEMENTS FOR TRACKING PURPOSES," U.S. patent application Ser. No. 11/536,559, filed Sep. 28, 2006, entitled "MAPPING MOVEMENTS OF A HAND-HELD CONTROLLER TO THE TWO-DIMENSIONAL IMAGE PLANE OF A DISPLAY SCREEN," U.S. patent application Ser. No. 11/551,197, filed Oct. 19, 2006, entitled "CONTROLLER CONFIGURED TO TRACK USER'S LEVEL OF ANXIETY AND OTHER MENTAL AND PHYSICAL ATTRIBUTES," and U.S. patent application Ser. No. 11/551,682, filed Oct. 20, 2006, entitled "GAME CONTROL USING THREE-DIMENSIONAL MOTIONS OF CONTROLLER," the entire disclosures of which are all hereby incorporated herein by reference in there entireties.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:
    running a simulation;
    receiving information from a control interface used by a user to interact with the simulation, wherein the received information comprises information relating to frequency or severity of the three-dimensional movements of an object;
    analyzing the received information relating to the frequency or severity of the three-dimensional movements of the object;
    forming at least an indication of the user's level of skill based on the analysis of the received information relating to the frequency or severity of the three-dimensional movements of the object; and
    dynamically adjusting a difficulty level of the simulation based on the indication of the user's level of skill.

2. A method in accordance with claim 1, wherein analyzing the received information comprises gauging one or more of the user's response times in the simulation.

3. A method in accordance with claim 2, wherein analyzing the received information further comprises compiling a history of the user's response times in the simulation.

4. A method in accordance with claim 1, wherein analyzing the received information comprises compiling a history of accuracies of a plurality of the user's responses in the simulation.

5. A method in accordance with claim 1, wherein receiving information from the control interface comprises using at least one of inertial, video, acoustical or infrared analysis to track three-dimensional movements of the object.

6. A method in accordance with claim 5, wherein analyzing the received information comprises compiling a history of the three-dimensional movements of the object.

7. A method in accordance with claim 5, wherein analyzing the received information comprises comparing the information relating to the three-dimensional movements of the object with information relating to an accuracy of one or more of the user's responses in the simulation.

8. A method in accordance with claim 1, wherein adjusting the difficulty level of the simulation comprises adjusting a display duration of one or more visual cues.

9. A method in accordance with claim 1, wherein adjusting the difficulty level of the simulation comprises adjusting a volume of one or more auditory cues.

10. A method in accordance with claim 1, wherein adjusting the difficulty level of the simulation comprises adjusting a display location of one or more visual cues.

11. A non-transitory storage medium storing a computer program executable by a processor based system, the computer program causing the processor based system to execute steps comprising:
    running a simulation;
    receiving information from a control interface used by a user to interact with the simulation, wherein the received information comprises information relating to frequency or severity of the three-dimensional movements of an object;
    analyzing the received information relating to the frequency or severity of the three-dimensional movements of the object;
    forming at least an indication of the user's level of skill based on the analysis of the received information relating to the frequency or severity of the three-dimensional movements of the object; and
    dynamically adjusting a difficulty level of the simulation based on the indication of the user's level of skill.

12. A storage medium in accordance with claim 11, wherein analyzing the received information comprises gauging one or more of the user's response times in the simulation.

13. A storage medium in accordance with claim 12, wherein analyzing the received information further comprises compiling a history of the user's response times in the simulation.

14. A storage medium in accordance with claim 11, wherein analyzing the received information comprises compiling a history of accuracies of a plurality of the user's responses in the simulation.

15. A storage medium in accordance with claim 11, wherein receiving information from the control interface comprises using at least one of inertial, video, acoustical or infrared analysis to track three-dimensional movements of the object.

16. A storage medium in accordance with claim 15, wherein analyzing the received information comprises compiling a history of the three-dimensional movements of the object.

17. A storage medium in accordance with claim 15, wherein analyzing the received information comprises comparing the information relating to the three-dimensional movements of the object with information relating to an accuracy of one or more of the user's responses in the simulation.

18. A storage medium in accordance with claim 11, wherein adjusting the difficulty level of the simulation comprises adjusting a display duration of one or more visual cues.

19. A storage medium in accordance with claim 11, wherein adjusting the difficulty level of the simulation comprises adjusting a volume of one or more auditory cues.

20. A storage medium in accordance with claim 11, wherein adjusting the difficulty level of the simulation comprises adjusting a display location of one or more visual cues.

21. A game console, comprising:
- a control interface for use by a user to interact with a simulation, the control interface being used to track frequency or severity of the three-dimensional movements of an object; and
- a processor based system configured to run the simulation, receive information from the control interface relating to the frequency or severity of the three-dimensional movements of the object, analyze the received information, form at least an indication of the user's level of skill based on the analysis of the received information, and dynamically adjust a difficulty level of the simulation based on the indication of the user's level of skill.

22. A game console in accordance with claim 21, wherein analyzing the received information comprises gauging one or more of the user's response times in the simulation.

23. A game console in accordance with claim 21, wherein analyzing the received information further comprises compiling a history of the user's response times in the simulation.

24. A game console in accordance with claim 21, wherein analyzing the received information comprises compiling a history of accuracies of a plurality of the user's responses in the simulation.

25. A game console in accordance with claim 21, wherein the control interface uses at least one of inertial, video, acoustical or infrared analysis to track the three-dimensional movements of the object.

26. A game console in accordance with claim 25, wherein analyzing the received information comprises compiling a history of the three-dimensional movements of the object.

27. A game console in accordance with claim 25, wherein analyzing the received information comprises comparing the information relating to the three-dimensional movements of the object with information relating to an accuracy of one or more of the user's responses in the simulation.

28. A game console in accordance with claim 21, wherein the adjusting a difficulty level of the simulation comprises adjusting a display duration of one or more visual cues.

29. A game console in accordance with claim 21, wherein the adjusting a difficulty level of the simulation comprises adjusting a volume of one or more auditory cues.

30. A game console in accordance with claim 21, wherein the adjusting a difficulty level of the simulation comprises adjusting a display location of one or more visual cues.

* * * * *